(12) United States Patent
Burkhardt

(10) Patent No.: US 7,945,371 B2
(45) Date of Patent: May 17, 2011

(54) METHOD AND DEVICE FOR DETERMINING THE AMBIENT PRESSURE BY MEANS OF A CHARGE PRESSURE SENSOR IN A TURBOCHARGED ENGINE

(75) Inventor: Thomas Burkhardt, Neutraubling (DE)

(73) Assignee: Continenetal Automotive GmbH, Hannover (DE)

( * ) Notice: Subject to any disclaimer, the term of this patent is extended or adjusted under 35 U.S.C. 154(b) by 322 days.

(21) Appl. No.: 12/298,931

(22) PCT Filed: May 25, 2007

(86) PCT No.: PCT/EP2007/055122
§ 371 (c)(1),
(2), (4) Date: Oct. 29, 2008

(87) PCT Pub. No.: WO2008/009506
PCT Pub. Date: Jan. 24, 2008

(65) Prior Publication Data
US 2009/0132148 A1    May 21, 2009

(30) Foreign Application Priority Data
Jul. 19, 2006  (DE) .......................... 10 2006 033 460

(51) Int. Cl.
 *F02B 33/00* (2006.01)
(52) U.S. Cl. .................. 701/102; 73/114.31; 73/114.37; 123/677
(58) Field of Classification Search ............... 73/114.31, 73/114.37; 701/102; 123/677
See application file for complete search history.

(56) References Cited

U.S. PATENT DOCUMENTS

| 4,597,265 | A | 7/1986 | Buck et al. ..................... 60/602 |
| 5,614,667 | A | 3/1997 | Hosoya ........................ 73/118.2 |
| 6,445,996 | B1 | 9/2002 | Corbeels et al. .............. 701/104 |
| 6,505,505 | B1 * | 1/2003 | Henzinger et al. ......... 73/114.18 |
| 6,698,203 | B2 * | 3/2004 | Wang .............................. 60/611 |
| 7,293,452 | B2 * | 11/2007 | Vibert et al. ............... 73/114.36 |
| 7,628,061 | B2 * | 12/2009 | Dingl et al. ................ 73/114.37 |
| 7,631,551 | B2 * | 12/2009 | Wang et al. ................ 73/114.37 |

FOREIGN PATENT DOCUMENTS

| DE | 34 38 176 A1 | 4/1986 |
| DE | 196 03 778 A1 | 8/1996 |
| DE | 10 2005 015 110 B3 | 8/2006 |
| FR | 2 849 897 A | 1/2004 |
| GB | 2 078 856 A | 1/1982 |
| JP | 2005036733 A | 2/2005 |
| KR | 2001 0095414 A | 7/2001 |

* cited by examiner

Primary Examiner — Erick Solis
(74) Attorney, Agent, or Firm — King & Spalding L.L.P.

(57) ABSTRACT

In turbocharged engines, there is the problem that, in particular under load, the ambient pressure (AMP) cannot be determined directly from the measurement values of a charge-pressure sensor (8). In order to avoid the installation of a further pressure sensor which is suitable for the detection of the ambient pressure (AMP), it is proposed that, during a negative load step of the internal combustion engine in which a switch takes place from supercharged engine operation into non-supercharged engine operation, the charge-pressure sensor (8) measures the transient profile of the charge pressure (PUT). A value for the ambient pressure (AMP) is determined from the transient profile of the charge pressure (PUT). Through the pressure value for the present ambient pressure (AMP), it is possible to optimize the engine operation for example when travelling up a slope.

19 Claims, 4 Drawing Sheets

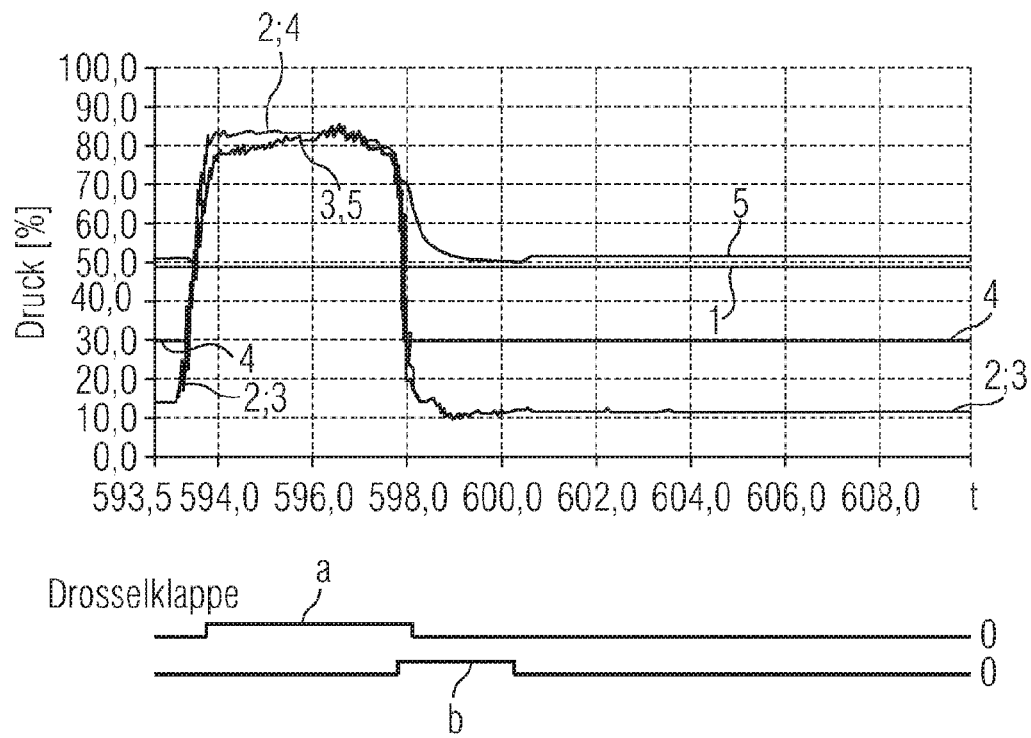
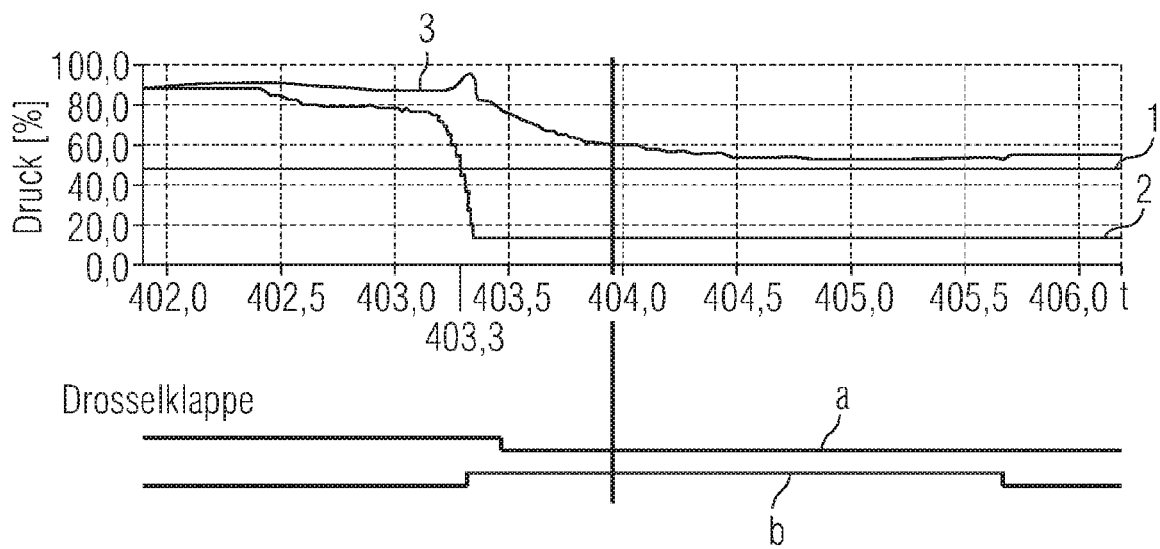

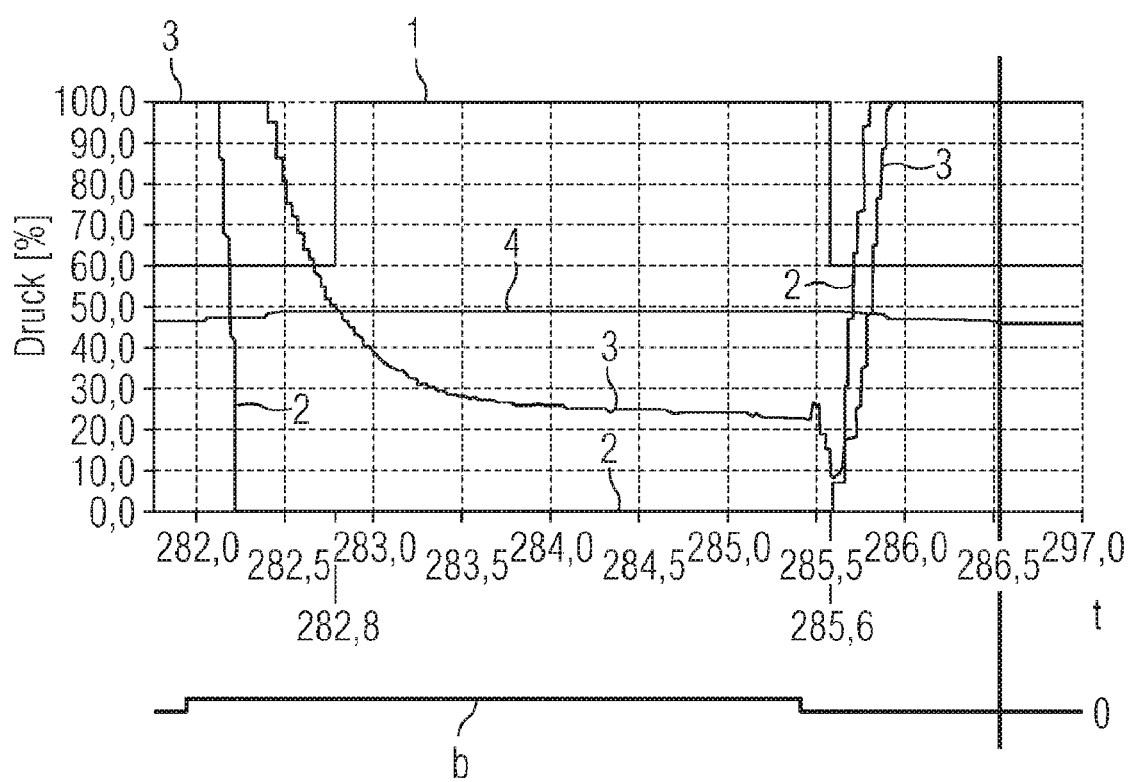

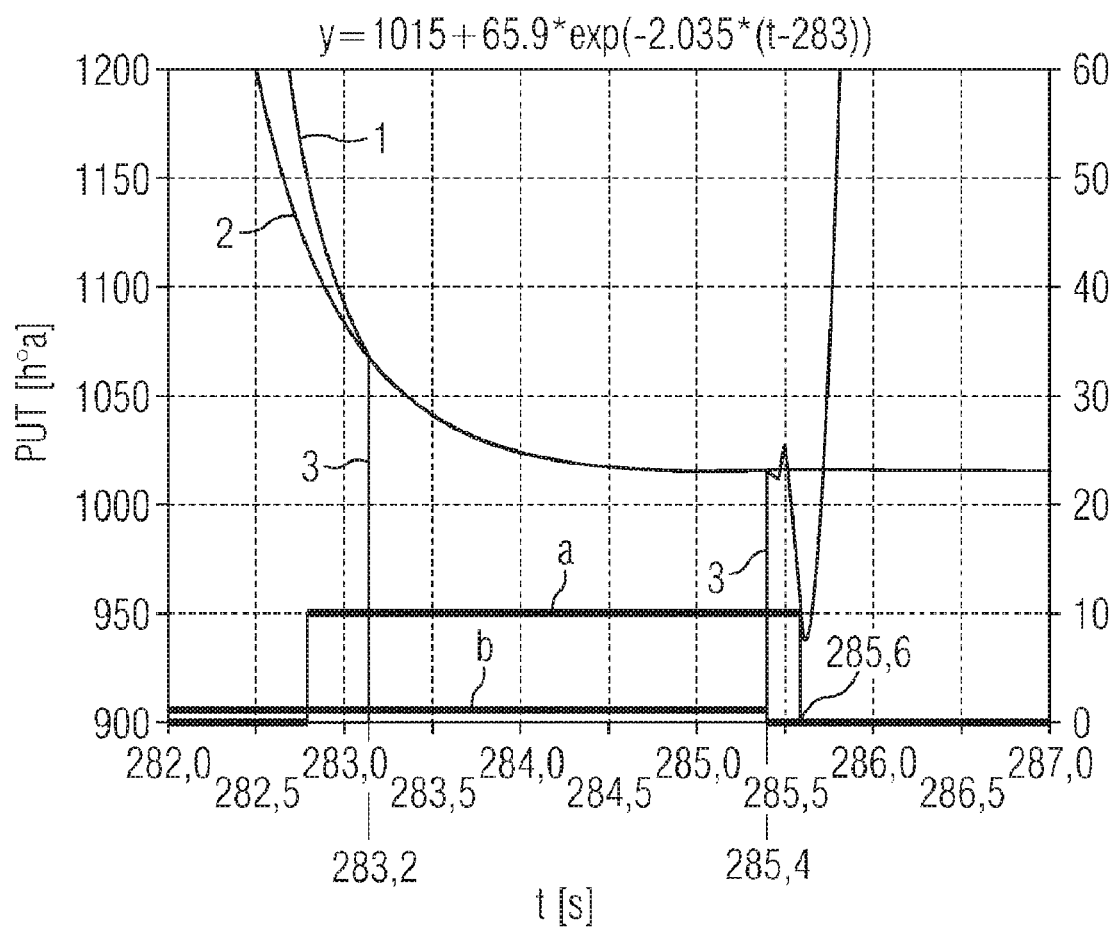

METHOD AND DEVICE FOR DETERMINING THE AMBIENT PRESSURE BY MEANS OF A CHARGE PRESSURE SENSOR IN A TURBOCHARGED ENGINE

CROSS-REFERENCE TO RELATED APPLICATIONS

This application is a U.S. National Stage Application of International Application No. PCT/EP2007/055122 filed May 25, 2007, which designates the United States of America, and claims priority to German Application No. 10 2006 033 460.4 filed Jul. 19, 2006, the contents of which are hereby incorporated by reference in their entirety.

TECHNICAL FIELD

The invention relates to a method and a device for determining a pressure value for the ambient air of a internal combustion engine of a motor vehicle.

BACKGROUND

It is already known that the ambient air pressure (ambient pressure) influences the behavior of the internal combustion engine. To allow for this influence, the information regarding the ambient pressure is, for example, measured by means of a suitable ambient-pressure sensor and transmitted to an engine control unit with a program-controlled processing unit. In the engine control unit, a suitable correction factor for the ambient pressure is calculated from the measured pressure values, so that engine actuators, for example injection valves etc., can be controlled as necessary relative to the ambient pressure. The disadvantage is that the ambient pressure has to be measured by means of a separate ambient-pressure sensor.

In order to avoid the use of an ambient-air pressure, which has to be additionally installed, the ambient pressure can be determined from existing measured and model values or from pressure values of a pressure sensor installed in the intake manifold and at a specific operating state of the engine. For example, the air pressure in the intake manifold is equal to ambient pressure with the engine stationary. The intake manifold pressure in this case is measured by means of a pressure sensor which is arranged at a suitable point in an intake manifold, downstream of a throttle valve.

It is furthermore known in an aspirated engine operating at full load the intake manifold pressure differs from the ambient air pressure. This pressure difference is, however, dependent on the air mass flow in the intake manifold and is essentially equal to the pressure drop at the air cleaner, which can be easily determined and stored as a curve. Therefore the current ambient pressure can be inferred from a known pressure drop at the air cleaner and air mass flow in the intake manifold or from the intake manifold pressure. However, this method can be used only for aspirated engines which do not have a compressor (turbocharger). With a turbocharged engine, with which the air mass flow in the induction tract is controlled by a charger, the aforementioned method can be used to determine the ambient pressure only with the engine stationary. This method cannot be used for turbocharged engines under high load because due to the charger the intake manifold pressure differs from the ambient pressure depending upon the operating state of the engine. Therefore, in this case there is no mathematical or physical relationship between the intake manifold pressure and the ambient pressure to be determined.

A further problem is that the ambient pressure can change very quickly when ascending or descending a hill. For this reason, it is desirable for the ambient pressure to be continuously matched and/or determined. To solve this problem, a further pressure sensor, which directly measures the ambient pressure, is used on known turbocharged engines. An ambient pressure sensor of this kind is, however, undesirable because it not only causes extra costs during the manufacture of the vehicle but as a fault source it can have a negative influence on the engine control.

SUMMARY

The detection of the ambient pressure in a turbocharged engine can be simplified without the use of an additional ambient pressure sensor.

According to an embodiment, a method for determining a pressure value for the ambient air of an internal combustion engine of a motor vehicle, with the internal combustion engine being designed as a turbocharged engine with a controllable induction tract, which, viewed in the direction of flow of the aspirated combustion air, has a charger, a charge-air sensor and a throttle valve, in series in that order, with the charge-pressure sensor detecting a charge pressure generated by the charger, may comprise the steps of: —to determine the ambient pressure, the internal combustion engine is first in a supercharged engine operation, —when a negative load step occurs at which the internal combustion engine switches from the supercharged engine operation to a non-supercharged engine operation, measuring the charge pressure and recording the transient profile of the charge pressure and—determining a value of a current ambient pressure from the transient profile of the charge-pressure.

According to a further embodiment, the supercharged operation of the engine can be initiated by at least one of opening the throttle valve and resetting a turbine actuator, for example of the waste gate, to increase the supercharging performance, or aspirated operation can be initiated by closing the throttle valve. According to a further embodiment, when the negative load step occurs a recirculating valve can be opened for a predetermined time duration, with the recirculation valve being arranged in a bypass line parallel to the charger and the output of the charger being bypassed to its inlet. According to a further embodiment, the transient profile of the charge pressure can be determined during the opening phase of the recirculation valve. According to a further embodiment, the transient profile of the charge pressure can also be calculated by means of an exponential equation
$PUT = PUT_0 + a \cdot \exp(-b \cdot (t-t_0))$
whereby $PUT_0$, a and b are parameters of the exponential equation, t is a time and $t_0$ indicates the start of the negative load step. According to a further embodiment, the parameters $PUT_0$, a and/or b of the exponential equation can be determined by fitting with the measured transient charge-pressure curve, with the transient profile of the charge pressure being essentially calculated during the opening period of the recirculation valve. According to a further embodiment, the initial value or the estimation of $PUT_0$ can either be predetermined or taken from a memory.

According to another embodiment, a device for determining a pressure value for the ambient air of an internal combustion engine of a motor vehicle with an induction tract which, viewed in the direction of flow of the aspirated combustion air, has a charger, a charge-pressure sensor and a throttle valve, arranged in series in that order, and has a program-controlled processing unit, wherein—a bypass line with a controllable recirculation valve is arranged parallel to the charger, —the processing unit being operable to open the recirculation valve for a predetermined time period if a negative load step of the internal combustion engine occurs, —the charge-pressure sensor detects a transient profile of the charge pressure during the predetermined time duration and the measured values are transmitted to the processing unit, —the processing unit is further operable to determine, with the aid of an algorithm, a pressure value for the ambient pressure from the transient profile of the charge pressure.

According to a further embodiment, the processing unit may be operable to determine the pressure value for the ambient pressure by fitting using an exponential equation. According to a further embodiment, a turbocharged engine may be fitted with an ambient-pressure sensor for measuring the ambient pressure and the computing unit is operable to compare the measured ambient pressure with the determined ambient pressure.

BRIEF DESCRIPTION OF THE DRAWINGS

An example of an embodiment of the invention is shown in the drawing and is described in more detail in the following.

FIG. 2 shows a diagram with several pressure curves;

FIG. 3 shows a further diagram showing how the exponential equation is determined;

FIG. 4 shows a third diagram with further pressure curves; and

FIG. 5 shows a flow diagram with a fitted exponential equation.

DETAILED DESCRIPTION

Figure 1:
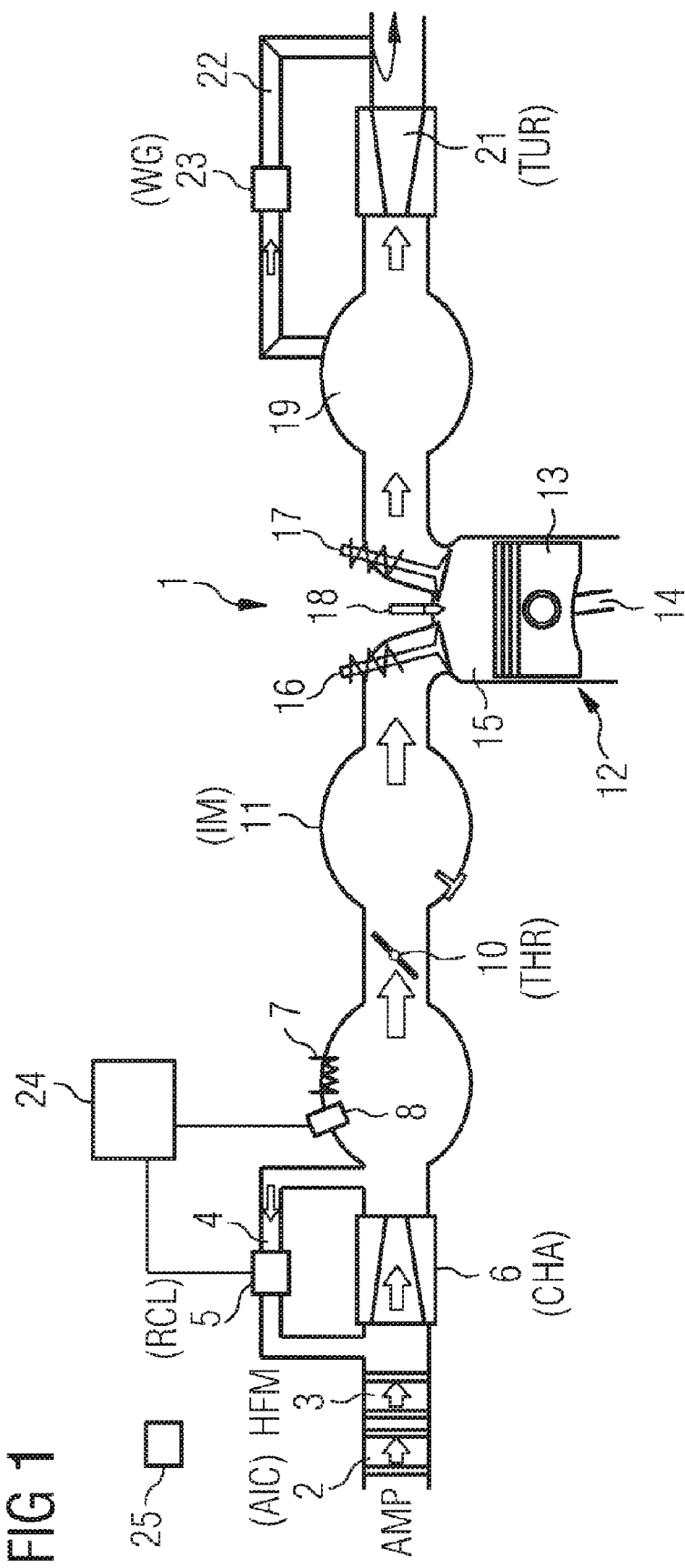
FIG. 1 shows a schematic representation of an arrangement for an induction tract of a turbocharged engine.

An advantage of the various embodiments for determining a pressure value for the ambient air of an internal combustion engine of a motor vehicle or of the device is that a pressure sensor for detecting the ambient pressure is not required because the ambient pressure is determined from the transient profile of the charge pressure at a specific operating state. This makes use of the fact that, preferably at a negative load step of the turbocharged engine, i.e. when a switch takes place from supercharged engine operation to non-supercharged engine operation, the current ambient pressure can be determined from the transient profile of the charge pressure measured by a charge-pressure sensor. This method is very easy to accomplish and can be used almost any number of times, especially when the vehicle is being driven. In this way, correction values for the current ambient pressure can be determined, practically continuously, while the vehicle is being driven.

A particular advantage to be seen from various further embodiments is that a switch from the supercharged engine operation to the non-supercharged engine operation or aspirated operation can be achieved simply by actuating the throttle valve from the open to the closed position. This operation takes place when driving a vehicle, for example every time the driver of the vehicle lifts his foot from the gas pedal and the engine thus switches from on-load operation to overrun operation.

Because with a turbocharged engine a positive pressure is produced upstream of the throttle valve due to the inertia of the charger when the throttle valve is closed, it is provided according to an embodiment that a bypass line, which can be controlled by a recirculation valve, is provided parallel to the charger. The recirculation valve is in this case opened for a predetermined time period and the resulting transient pressure profile upstream of the throttle valve is detected by the charge-pressure sensor. The ambient pressure can then be determined from the transient pressure profile by means of a suitable algorithm.

A further advantageous aspect according to an embodiment is that the transient profile of the charge pressure is calculated using an exponential equation. The variable parameters of the exponential equation can in this case be determined very simply by curve matching (fitting) and comparison with the measured transient pressure curve.

To determine the initial value of the exponential equation, it is provided that a suitable initial value is determined in advance and stored in a memory. It is then available for the further calculation of the ambient pressure.

FIG. 1 is a schematic representation of an exemplary embodiment with an induction tract 1, which can be used for a turbocharged engine. The induction tract 1 can be designed for either a gasoline engine or a diesel engine (turbocharged engine). The induction tract 1 is of tubular design and has an inlet opening, shown on the left side in FIG. 1, through which the ambient air is fed into a combustion chamber 15 of a cylinder 12 of the turbocharged engine. The ambient air supplied to the engine is at ambient pressure AMP. During the operation of the vehicle, the ambient pressure AMP can change, for example due to weather conditions or geographic altitude, i.e. driving up or down hills. A current value of the ambient pressure AMP is, however, an important variable for engine control because it exercises an influence on the behavior of the engine and on the exhaust-gas emissions. For modern internal combustion engines, the control of the engine actuators is therefore matched and corrected relative to the current value of the ambient pressure. The current ambient pressure AMP is not measured directly, as is usual according to the known prior art, but is instead calculated as explained in more detail later.

The aspirated ambient air is first passed through an air cleaner 2 (AIC) and an optional air mass meter 3 (HFM) and then enters the inlet opening of a charger 6 (CHA). A bypass line 4 is arranged parallel to the charger 6, with the passage of air through the bypass line 4 being controlled by a recirculation valve 5 (RCL). The recirculation valve 5 is normally closed and is only opened if a negative load step occurs in the engine, i.e. if the engine is switched from supercharged operation to non-supercharged operation (aspirated operation) and a simultaneous determination of the ambient pressure AMP takes place.

The arrows shown in FIG. 1 show the direction of flow of the aspirated ambient air. The length of the arrows symbolizes the mass flow.

The air compressed by the charger 6 passes via a charge-air cooler 7 to a throttle valve 10 (THR) and then into an intake manifold 11 (IM). A charge-air pressure sensor 8 is arranged in the area of the charge-air cooler 7 or downstream of the charge-air cooler 7, and measures the charge pressure PUT (pressure upstream throttle)—seen in the direction of flow—upstream of the throttle valve 10 and transmits it to a program-controlled processing unit 24. The processing unit 24 is furthermore electroconductively connected to the recirculation valve 5 and controls the opening duration of said recirculation valve 5.

The charge pressure changes on the one hand relative to the speed of the charger 6 and on the other hand relative to the position of the throttle valve 10. The engine is in supercharged operation if the throttle valve 10 is fully open and in non-supercharged operation if the throttle valve 10 is approximately closed. Furthermore, the charge pressure PUT is controlled by the status of the recirculation valve 5, i.e. if the recirculation valve 5 is open some of the air mass upstream of the throttle valve 10 is returned to the inlet of the charger 6. In contrast, with the recirculation valve 5 closed the bypass line 4 is blocked and no air can be returned.

With the throttle valve 10 open and the recirculation valve 5 closed, the air passes via an inlet valve 16 into the combustion chamber 15 of the cylinder 12 of the internal combustion engine. The cylinder 12 has a piston 13 which transmits its movement to a connecting rod 14 and thus drives a crankshaft. Furthermore, an injection valve 18, through which metered fuel can be supplied, is arranged on the cylinder head of the engine.

After combustion of the fuel-air mixture in the combustion changer 15 an outlet valve 17 is opened so that the generated exhaust gas is passed out via an exhaust gas manifold 19 into a turbine 21. The turbine 21 has turbine blades which are driven at a high rotational speed by the turbine. The turbine 21 is mechanically connected to the charger 6 and therefore drives the charger 6 relative to the flow of exhaust gas. Parallel to the turbine 21 is a bypass line 22 with the passage of gas through the bypass line being controlled by a waste gate 23 (WG). By actuation of the waste gate 23 a portion of the exhaust gas can thus bypass the turbine and the rotational speed of the turbine can therefore be controlled. After flowing through the turbine 21 or the bypass line 22 the exhaust gas enters the exhaust-gas system of the motor vehicle.

An essential aspect of the various embodiments is that with a turbocharged engine the ambient pressure can be repeatedly determined from the measured values of the charge-air pressure sensor 8 during driving, each time a negative load step occurs. An ambient-air pressure sensor such as is used with present prior art is not necessary. According to an embodiment, to determine the ambient pressure AMP, the short time period is used in which during the occurrence of a negative load step from the supercharged engine operation the recirculation valve 5 is open for a short period, e.g. from a few tenths of a second up to a few seconds. During the opening time of the recirculation valve, the transient profile of the charge pressure before the throttle valve 10 is now measured or detected by means of the charge-pressure sensor 8. The current ambient pressure AMP is then determined with the aid of an exponential equation, which is explained in more detail later with the aid of diagrams.

For the special case of the stationery turbocharged engine, the pressure value PUT of the charge-air sensor 8 corresponds to the ambient pressure AMP. During operation of the turbocharger the pressure in the intake manifold 11 at high load is greater than the ambient pressure AMP. In this case, the ambient pressure AMP cannot be determined from the intake manifold pressure. Because the ambient pressure AMP can change considerably during engine operation, e.g. when driving up or down hills, it is possible to determine the ambient pressure AMP by direct pressure measurement at a different position only with the engine stopped. This, however, is not sufficient for a precise engine control during conditions of changing ambient pressure AMP.

A pressure drop occurs at the air cleaner 2 depending on the degree of contamination of the air cleaner 2, so that the pressure before the charger 6 is always lower than the ambient pressure AMP. The pressure drop through the air cleaner 2 depends on the air mass flow and can be calculated as a curve relative to the air mass flow $$\Delta p_{alc}(MAF\_KGH)$$

and stored, with $\Delta p_{alc}$ being the estimated pressure drop at the air cleaner and MAF_KGH the air mass flow in kg/h.

The main components of the turbocharger are the turbine 21 and the charger 6. The charger 6 serves to compress the aspirated air at high engine load. Therefore at high engine load the charge pressure at the charger outlet (PUT, pressure upstream throttle) is higher than the pressure before the charger 6. At low engine load, which is characterized by a low intake manifold pressure MAP (manifold air pressure) or designated by the engine operating state PU (pull, overrun operation) or PUC (pull fuel cutoff), the turbocharger produces almost no compression.

The pressure rise through the charger 6 at a low engine load can be determined as a characteristic curve by means of the air mass flow $$\Delta p_{cha}(MAF\_KGH)$$

and stored as a curve, with $\Delta p_{cha}$ being the pressure difference via the charger and MAF_KGH the air mass in kg/h.

For a simple case where the engine is idling in a steady state under low engine load or in a steady state overrun operation during a long downhill run (engine state PU or PUC), the ambient pressure AMP can be estimated on the basis of the charge pressure PUT measured by the charge-pressure sensor 8 in accordance with the following equations $$AMP_{est\ im} = PUT - \Delta p_{cha}(MAF\_KGH) + \Delta p_{alc}(MAF\_KGH)$$

or the model value $AMP_{est\ im}$ can be incremented or decremented in the direction $$PUT - \Delta p_{cha}(MAF\_KGH) + \Delta p_{alc}(MAF\_KGH)$$

With the previously described formula, the ambient pressure can of course be determined only during shutdown, during idling or during a long overrun phase of the motor vehicle. This determination of the ambient pressure AMP is, for example, not sufficient during a long hill drive during which there is a reducing ambient pressure because none of the named operating states is achieved.

The various embodiments are based on the fact that after the negative load step of the engine from supercharged to non-supercharged engine operation the charge pressure PUT before the throttle valve 10 drops. This is, for example, the case if the driver of the vehicle, for example on a hill stretch, throttles back before a curve or bend, changes down a gear or steps on the brake. In these cases, which cover a very short time period and, for example, can take place within a second, the charge pressure PUT before the throttle valve drops and inclines towards a value which would be established in a similar manner as for a long-lasting overrun operation or a drive down a hill. This effect is used for the various embodiments and is described in more detail in conjunction with the following diagrams.

FIG. 2 shows a first diagram on which several pressure curves are entered. The pressure values are entered on the Y-axis as a percentage of the maximum value and an (arbitrary) measuring time in seconds is entered on the X-axis. The diagram in FIG. 2 shows pressure profiles, which were predetermined during a load demand using a suitable model or measured by the charge-pressure sensor 8. In this case, the recirculation valve 5 was opened for approximately two seconds over a time period of approximately 598.0 to 600.00. The pressure profile was recorded in the 593.5 to approximately 608.00 time range. At approximately 593.8 the throttle valve 10 was opened for approximately four seconds and the waste gate 23 was closed. This resulted in the rising part of the curves. The engine is in the supercharged operating state. At approximately t=598.00 the throttle valve 10 is closed so that the engine performs a negative load step and switches to the non-supercharged operating state.

The shown pressure curves have the following meanings. The horizontal curve 1 at 50% shows the current ambient pressure AMP, which for example is 982.74 hPa. This is the actual value of the current ambient pressure AMP which is determined by means of the charge-pressure sensor 8 and the algorithm according to an embodiment. In FIG. 2, this ambient pressure is assumed to be constant.

Both curves 2 and 3 show the desired, or actual, pressure profile in the intake manifold MAP in the intake manifold 11 downstream of the throttle valve 10. Curve 2 shows theoretically determined desired values for the intake manifold pressure downstream of the throttle valve 10 (map_sp manifold air pressure), which was calculated for a load demand on the basis of the existing model. Curve 2 begins at approximately 13% and then rises steeply at approximately t=593.8 to approximately 83% and then continues horizontally up to timepoint 598.0. Now, the throttle valve 10 closes suddenly due to the drop of curve 2 to approximately 10%. Curve 2 corresponds to the predetermined desired pressure in the intake manifold 11, i.e. downstream after the throttle valve 10.

Curve 3 corresponds to the actual profile of the pressure curve (actual value, map_mes) in the intake manifold 11 downstream of the throttle valve 10 as measured in the intake manifold by the change in the throttle valve setting or adjusted to the desired pressure and measured by means of the intake-manifold sensor. As can be seen in FIG. 2, the curve 3 also begins at approximately 13% the same as curve 2 and rises almost equally quickly as curve 2 to approximately 594.0. However, because of the alignment it reaches its maximum value somewhat later than the predetermined set value curve 2.

After the throttle valve 10 has closed, curve 3 drops to the value of approximately 10% equally steeply as curve 2. Both curves 2 and 3 are practically congruent.

Both curves 4 and 5 show the desired and actual pressure profile of the change pressure PUT before the throttle valve 10. Curve 4 is a modeled desired pressure curve for the charge pressure PUT, which begins at approximately 30% and at approximately t=593.8 rises parallel to curve 2. Both curves 2 and 4 are practically superimposed at approximately 85%. After the throttle valve 10 has closed at t=598.0 curve 4 again drops to 30% and remains at this pressure value.

Curve 5 corresponds to the actual value for the transient pressure profile (actual charge pressure PUT) upstream of the throttle valve 10, as measured by the charge-pressure sensor 8. Curve 5 begins at approximately 52%, drops briefly at t=593.8 to 50% of curve 1 (AMP) and then climbs congruent with curve 3 when the throttle valve 10 is opened. After the throttle valve has closed at approximately 598.0 curve 5, however, drops according to an exponential function (exponential equation) to approximately equal to the ambient pressure AMP and then increases again with a small offset. According to various embodiments, this sloping part of the curve is used to determine the ambient pressure AMP.

By extrapolation of the exponential equation this section of the curve approximately reaches its end value at timepoint 600.0. This end value corresponds in this case to the actual ambient pressure AMP, shown by curve 1. For this typical transient pressure profile of the charge pressure PUT, which is established at each negative load change from supercharged to non-supercharged engine state, according to various embodiments a pressure value for a current ambient pressure AMP is calculated from a fitted exponential equation.

Two further digital curves, shown as bits a and b, are entered below the already-described diagram. Bit a shows the time duration during which the charge pressure PUT is actively controlled. Bit b shows the opening time and opening duration for the recirculation valve 5. As shown in diagram b, the recirculation valve 5 is open during the time period t=598.0 and approximately t=600.0, i.e. for approximately two seconds. The descending part of curve 5 which takes place in this time period is evaluated by using the fitted exponential equation, which is explained in more detail later.

FIG. 3 shows pressure curves of a further exemplary embodiment. However, in this diagram only the desired (curve 2) and actual pressure profile (curve 3) of the charge pressure PUT upstream of the throttle valve 10 during a longer opening duration of the recirculation valve 5 is shown. The profile of curve 1 is horizontal at approximately 48% and in turn corresponds to the ambient pressure AMP. This curve is comparable with curve 1 in FIG. 2.

Curves 2 and 3 both begin at approximately 89% and initially have an approximately horizontal profile, because at this timepoint the engine is still operating supercharged. Curve 2 is a modeled set value curve for the charge pressure PUT upstream of the throttle valve 10. Curve 2 is comparable with the profile of curve 4 in FIG. 2. Because of the negative load step, curve 2 drops approximately to the value 10%, then has a horizontal profile followed by an opening of the recirculation valve 5 at timepoint t=403.3.

Curve 3 corresponds to the actual pressure profile for the charge pressure PUT. The descending part of curve 3 corresponds to that of curve 5 in FIG. 2. The curve profile is evaluated for the opening duration of the recirculation valve 5 and an exponential equation is calculated for this part of the curve. The ambient pressure AMP, which runs parallel to curve 1 and reaches approximately the 50% value, is in turn obtained by extrapolation of the exponential equation.

The recirculation valve 5 is opened from t=403.3 to t=405.7, corresponding to bit b, which is shown underneath the diagram. The evaluation of curve 3 takes place for this time period.

Both bit curves with bits a and b have already been explained in more detail with reference to FIG. 2.

The transient profile of the charge pressure PUT after a negative load step, i.e. the descending curve branch of curve 5 in FIG. 2 or of curve 3 in FIG. 3, is described as follows by an exponential equation in the general form $$PUT = PUT_0 + a \cdot \exp(-b \cdot (t-t_0))$$

with PUT being the pressure upstream of the throttle valve 10, $PUT_0$ the limit value of the pressure upstream of the throttle valve, $t_0$ the timepoint of the negative load step and a, b being further parameters of the exponential equation.

It is important in this case that inference regarding the current ambient pressure $AMP = PUT_0$ can also be drawn from a short transient PUT profile, which is clearly ended before reaching the ambient pressure PUT=AMP by renewed acceleration, by extrapolation of the exponential equation with respect to infinity.

For a better understanding of the evaluation, a further diagram, with which the transient profile of the charge pressure PUT for the exponential equation shown in FIG. 5 was evaluated, is shown in FIG. 4. As an example of a measurement, the profile of the charge pressure PUT was appropriately approximated for all negative load steps from supercharged operation.

FIG. 4 shows a third diagram of an exemplary embodiment in which the desired value for the charge pressure PUT (curve 2) and the actual value for the charge value PUT (curve 3) are shown for a negative load change. Curve 2 starts at 100% and drops to approximately 0 at t=282.3 in overrun operation of the engine and then remains there until, at t=285.5, acceleration takes place again and the curve ramps up to 100%.

Curve 3 corresponds to the measured actual value for the charge pressure PUT. Curve 3 also begins at 100% and at t=282.5 drops in accordance with an exponential function. During acceleration, the actual value curve 3 initially descends further up to timepoint t=285.5 but then climbs very quickly parallel to curve 2 up to 100%.

Curve 1 shows the operating state of the engine. The curve begins at approximately 60%, which corresponds to a part load (PL) operating condition of the engine. At timepoint t=282.8, curve 1 jumps to 100%, i.e. the overrun phase of the engine and the evaluation time for the actual value curve 3 now begin. The recirculation valve 5 has already opened somewhat earlier at timepoint t=280.0, as can be seen from bit b. The later evaluation timepoint (timepoint t=282.8) was chosen so that possible interference at the start of the descending branch could be masked out. The evaluation runs until curve 1 drops again to 60% at t=285.6, i.e. until the engine returns to part-load operation. The recirculation valve 5 closes and the overrun phase of the engine ends.

In the diagram in FIG. 5, curve 1 shows the exponential profile of the measured charge-pressure curve PUT shown in FIG. 4 (see FIG. 4, curve 3) and curve 2 shows the approximated profile of the charge pressure PUT, which was determined by fitting (best fit). Both vertical lines 3 at t=283.2 and t=285.4 show the evaluation range for the exponential equation. This range was determined by an AND operation of both bit curves b and the duration of the overrun operating state (PU) or overrun shut-off (PUC), with bit curve b from t=282.0 to t=285.4 showing the opening duration of the recirculation valve 5.

To determine the unknown parameters a, b, $PUT_0$, the general form of the exponential equation is approximated using a best fit method. The absolute element $PUT_0$ of the exponential function is the limit value of the pressure upstream of the throttle valve 10. The ambient pressure AMP can be estimated by correcting this limit value of the pressure upstream of the throttle valve 10 by the known air mass-dependent pressure changes via the air cleaner 2, the charger 6 and the charge-air cooler 7 according to the following equation.

$$AMP_{estim} = PUT_0 - \Delta p_{cha}(MAF\_KGH) + \Delta p_{alc}(MAF\_KGH)$$

where $\Delta p_{cha}(MAF\_KGH) > 0$.

In this way, the fitted exponential equation $$y = 1015 + 65.9 \cdot \exp(-2.035 \cdot (t-283))$$

in the range of the vertical lines 3 to be evaluated, shown by the time marks 283.2 and 285.4, is obtained.

With this exponential equation, the initial value $PUT_0 = 1015$ still has to be corrected by a value for the pressure drop via the charger in accordance with the equation $AMP_{estim}$. This is then the desired ambient pressure AMP. The value 65.9 is an amplification factor, the value −2.035 is the extension and 283 is the starting point for the measurement. Value $PUT_0$ is also determined by the best fit of the exponential equation and is then the only important result of the best fit.

The initial value for the estimation of $PUT_0$ can, for example, be taken from a previous measurement or from a suitable table, which is stored in a memory of the processing unit 24.

As can also be seen in FIG. 5, both curves 1 and 2 are congruent within the range of both vertical lines 3, which means that the approximated curve 2 coincides with the measured charge-pressure curve 3 and therefore the pressure value, determined by the exponential equation, corresponds to the actual ambient pressure AMP.

The invention can alternatively be used for a turbocharged engine which has an ambient-pressure sensor 25, with which the ambient pressure $AMP_{mess}$ is directly measured. In this case, by means of the inventive method, the existing ambient-pressure sensor 25 can be checked for plausibility by a simple comparison of both pressure values and the reliability of the measured value is thus improved.

What is claimed is:

1. A method for determining a pressure value for the ambient air of an internal combustion engine of a motor vehicle, with the internal combustion engine being designed as a turbocharged engine with a controllable induction tract which, viewed in the direction of flow of the aspirated combustion air, has a charger, a charge-air sensor and a throttle valve in series in that order, with the charge-pressure sensor detecting a charge pressure generated by the charger, that the method comprising the steps of:
    to determine the ambient pressure, the internal combustion engine is first in a supercharged engine operation,
    when a negative load step occurs at which the internal combustion engine switches from the supercharged engine operation to a non-supercharged engine operation, measuring the charge pressure and recording the transient profile of the charge pressure and
    determining a value of a current ambient pressure from the transient profile of the charge-pressure.

2. The method according to claim 1, wherein the supercharged operation of the engine is initiated by at least one of opening the throttle valve and resetting a turbine actuator to increase the supercharging performance, or aspirated operation is initiated by closing the throttle valve.

3. The method according to claim 1, wherein when the negative load step occurs, a recirculating valve is opened for a predetermined time duration, with the recirculation valve being arranged in a bypass line parallel to the charger and the output of the charger being bypassed to its inlet.

4. The method according to claim 3, wherein the transient profile of the charge pressure is determined during the opening phase of the recirculation valve.

5. The method according to claim 1, wherein the transient profile of the charge pressure can also be calculated by means of an exponential equation $$PUT = PUT_0 + a \cdot \exp(-b \cdot (t-t_0))$$

wherein $PUT_0$, a and b are parameters of the exponential equation, t is a time and $t_0$ indicates the start of the negative load step.

6. The method according to claim 5, wherein the parameters $PUT_0$, a and/or b of the exponential equation are determined by fitting with the measured transient charge-pressure curve, with the transient profile of the charge pressure being essentially calculated during the opening period of the recirculation valve.

7. The method according to claim 5, wherein the initial value or the estimation of $PUT_0$ is either predetermined or taken from a memory.

8. A device for determining a pressure value for the ambient air of an internal combustion engine of a motor vehicle with an induction tract which, viewed in the direction of flow of the aspirated combustion air, has a charger, a charge-pressure sensor and a throttle valve, arranged in series in that order, and has a program-controlled processing unit, wherein a bypass line with a controllable recirculation valve is arranged parallel to the charger, the processing unit being operable to open the recirculation valve for a predetermined time period if a negative load step of the internal combustion engine occurs, the charge-pressure sensor detects a transient profile of the charge pressure during the predetermined time duration and the measured values are transmitted to the processing unit, the processing unit is further operable to determine, with the aid of an algorithm, a pressure value for the ambient pressure from the transient profile of the charge pressure.

9. The device according to claim 8, wherein the processing unit is operable to determine the pressure value for the ambient pressure by fitting using an exponential equation.

10. The device according to claim 8, wherein a turbocharged engine is fitted with an ambient-pressure sensor for measuring the ambient pressure and the computing unit is operable to compare the measured ambient pressure with the determined ambient pressure.

11. A motor vehicle comprising an internal combustion engine being designed as a turbocharged engine with a controllable induction tract, which, viewed in the direction of flow of the aspirated combustion air, has a charger, a charge-air sensor and a throttle valve, in series in that order, with the charge-pressure sensor detecting a charge pressure generated by the charger, and comprising a device for determining a pressure value for the ambient air of the combustion engine, when the internal combustion engine is first in a supercharged engine operation, to determine the ambient pressure, the device being operable:

when a negative load step occurs at which the internal combustion engine switches from the supercharged engine operation to a non-supercharged engine operation, to measure the charge pressure and to record the transient profile of the charge pressure, and to determine a value of a current ambient pressure from the transient profile of the charge-pressure.

12. The device according to claim 11, wherein the internal combustion engine is operable to be initiated into the supercharged operation of the engine by at least one of opening the throttle valve and resetting a turbine actuator or to be initiated into aspirated operation by closing the throttle valve.

13. The device according to claim 12, wherein the turbine actuator is a waste gate.

14. The device according to claim 11, wherein when the negative load step occurs, a recirculating valve is opened for a predetermined time duration, with the recirculation valve being arranged in a bypass line parallel to the charger and the output of the charger being bypassed to its inlet.

15. The device according to claim 14, wherein the transient profile of the charge pressure is determined during the opening phase of the recirculation valve.

16. The device according to claim 11, wherein the transient profile of the charge pressure is calculated by means of an exponential equation $$PUT=PUT_0+a*\exp(-b*(t-t_0))$$

wherein $PUT_0$, a and b are parameters of the exponential equation, t is a time and $t_0$ indicates the start of the negative load step.

17. The device according to claim 16, wherein the parameters $PUT_0$, a and/or b of the exponential equation are determined by fitting with the measured transient charge-pressure curve, with the transient profile of the charge pressure being essentially calculated during the opening period of the recirculation valve.

18. The device according to claim 16, wherein the initial value or the estimation of $PUT_0$ is either predetermined or taken from a memory.

19. The method according to claim 2, wherein the turbine actuator is a waste gate.

* * * * *